June 16, 1936.   E. J. SCHMIDT   2,044,405
ANTIFRICTION BEARING
Filed Dec. 4, 1933
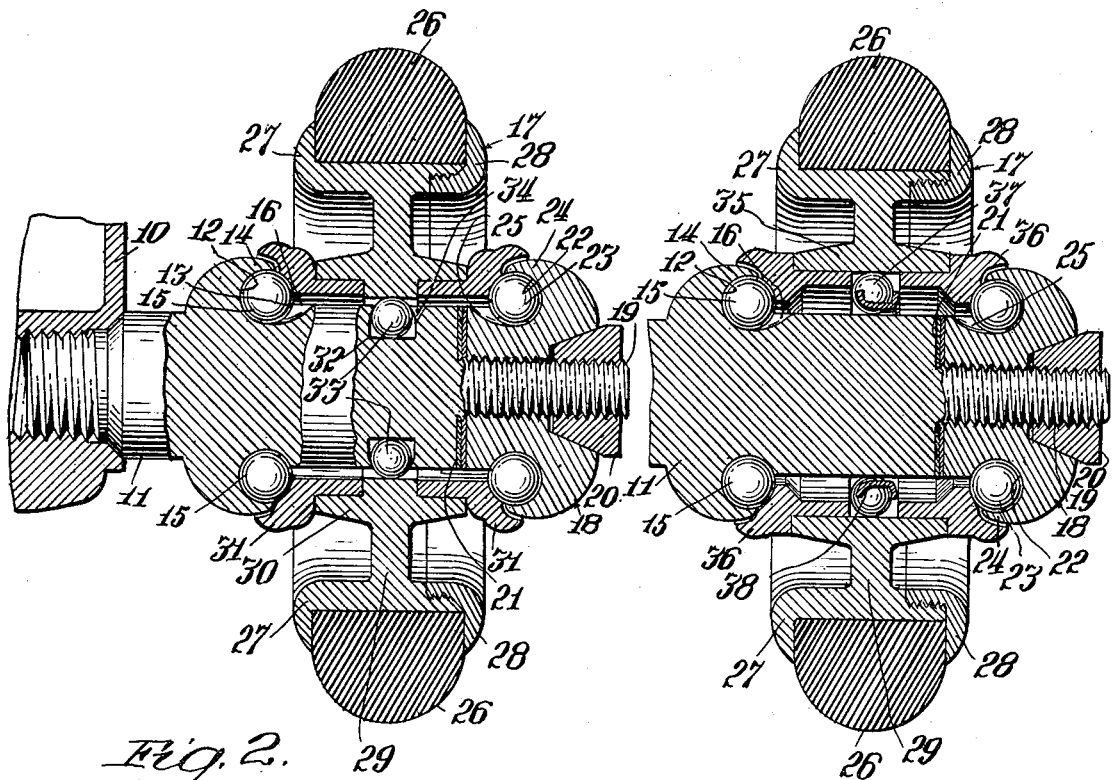
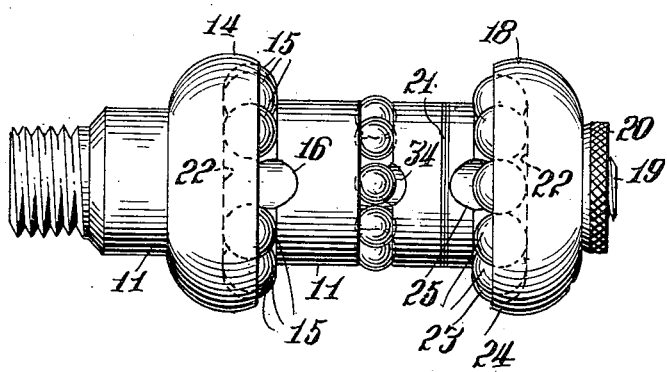
Inventor:
Erwin J. Schmidt,
By Frieke & DeBush
Att'ys Patented June 16, 1936

2,044,405

UNITED STATES PATENT OFFICE 2,044,405

ANTIFRICTION BEARING

Erwin J. Schmidt, Chicago, Ill., assignor, by mesne assignments, to Allied Engineering Company, Chicago, Ill., a corporation of Illinois Application December 4, 1933, Serial No. 700,870

5 Claims. (Cl. 308—198)

My invention relates to anti-friction bearings and it has for its object the provision of a new and improved form and arrangement of parts by reason of which an improved operation may be effected and greater convenience in handling and cleaning the bearing assembly may result. To these ends, it is one of the objects of my invention to provide an improved form of race and means for retaining the anti-friction devices therein, such race being provided sufficiently complete in one of the members of the bearing as to hold the balls or other anti-friction devices in position independently of the other member of the bearing, such race being formed preferably in the inside member corresponding ordinarily to the shaft. It is one of the objects of my invention to provide a construction of this type in which the anti-friction devices are mounted in a circumferential groove of such size and shape as to prevent insertion or removal of the devices at any point except that especially arranged in the form of a gate or notch for permitting the passage of the device, the gate or notch being preferably of such restricted size that the anti-friction device when inserted will not escape through the gate regardless of the position of the parts except upon the application of pressure thereon. It is one of the objects of my invention to provide an arrangement of this type in which the effective portions of the shoulders defining the notch or gate are located a short distance out of the path of movement of the anti-friction devices in the race whereby in operation the anti-friction devices are kept from contacting the shoulders and the action is kept smooth and free.

It is another object of my invention to provide a new and improved form and arangement of anti-friction bearing assembly comprising two sets of bearings arranged in spaced relation to each other and each designed particularly with respect to end thrust, with a third set of bearings interposed between said two sets and designed particularly with respect to side or radial thrust, the set of side thrust bearings and one of said sets of end thrust bearings being preferably mounted on the shaft or other inside member and held against movement longitudinally thereof, while the other set of end thrust bearings is mounted in a separate part which is detachably connected with said shaft or other inside member so as to be removable for insertion of the inside member into position in the outside member of the bearing. It is one of the objects of my invention to provide an arrangement of this type in which said separate part is in the form of a nut connected by screw threads with the shaft so as to be readily detachable, such separate parts serving both as the support for one of the sets of end thrust bearings and also as the means for preventing the withdrawal of the outside member from the inside member.

It is another object of my invention to improve anti-friction bearings in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a central vertical section through one of the preferred forms of my improved bearing assembly;

Fig. 2 is a side view of the inside member of the bearing shown in Fig. 1; and

Fig. 3 is a view similar to Fig. 1 but showing a slightly modified arrangement.

Referring now to Figs. 1 and 2 of the drawing in which corresponding parts are indicated by the same reference characters, 10 indicates a frame member of any approved type having an axle 11 connected by means of screw threads therewith. In the face of the axle member 11, I have provided a circumferential groove 12 defined by a comparatively shallow wall portion 13 at one side and by a comparatively much deeper wall portion 14 at the opposite side, the wall portion 14 extending laterally of the groove into position to overhang the deepest portion of the groove 12. Within the groove 12 there are a series of anti-friction balls 15 which are of such a size as to roll freely along the groove but to be held against withdrawal from the groove at any point other than at a gate or notch 16 in the shallow wall portion 13. The notch 16 is of such size and shape as to enable the anti-friction balls 15 to be inserted or withdrawn through the notch by the application of pressure thereto. The notch 16 is of very slightly smaller depth than that of the groove 12, and terminates at its inner end a very small distance short of the deepest portion of the groove. The arrangement is such that if the axle 11 were held in horizontal position as shown in Fig. 2 and then revolved about its horizontal axis, the balls 15 would have no tendency to enter the notch 16 even when said notch was directly at the bottom and the balls would thus be held from contacting the shoulders defining the notch. The balls 15 are further held in centered position in the groove 12 comprising the raceway by the pressure of the outside member 17 of the bearing which is provided with an obliquely disposed face portion engaging the balls so as to exert a pressure thereon inwardly and transversely with respect to the groove.

In the arrangement shown, the axle assembly is made up of two parts detachably and adjustably connected together, comprising a member 18 in the form of a nut secured by means of screw threads upon a shank 19 formed integrally with the axle proper. In the arrangement shown a lock nut 20 is provided for holding the nut securely in position, a plurality of shims 21 being provided preferably between the nut member 18 and the body of the axle member 11. The nut member 18 is provided with a groove 22 corresponding to the groove 12 in which are located a plurality of anti-friction balls 23 corresponding to the balls 15. In the arrangement shown the wall portion 24 at the outer edge of the groove overhangs the groove 22, and the insertion notch 25 through which the balls 23 are entered into position is provided in the same relation to the groove 22 as is above described in connection with the notch 16 and groove 12.

The outside bearing member 17, in the arrangement shown, is in the form of a supporting wheel equipped with a tire 26 of rubber or other suitable material. The flange of the wheel comprises two parts 27 and 28 connected together by means of screw threads, the part 27 being formed integrally with the web portion 29 of the wheel which in turn is formed integrally with a hub member 30. The hub member is provided with ring members 31 at its opposite ends which in the construction shown have a pressed fit in the ends of said hub member 30, the ring 31 at the left providing the obliquely disposed bearing face engaging the balls 15 as above described, and the ring 31 at the right providing an obliquely disposed face engaging the balls 23.

In the arrangement shown, an intermediate side or radial thrust bearing is provided between the axle member 11 and the outside bearing member 17 for cooperation with the end thrust bearings comprising the balls 15 and 23. In the arrangement shown in Fig. 1, the side thrust bearing comprises a groove 32 formed circumferentially of the axle member between the grooves 12 and 22, both side walls of the groove 32 being undercut in their inner sides. The arrangement is such that a series of balls 33 are adapted to roll freely along the groove 32 but are held from withdrawal from the groove at any point other than that at which the balls are insertable through a notch 34 in the side wall of the groove at one side thereof. In the arrangement shown, the balls 33 are capable of being inserted or withdrawn from the groove only upon the application of pressure thereto for moving the balls inwardly and transversely with respect to the groove. The arrangement is such that the balls 33 are normally held in centered position in the groove so as to remain at all times normally in spaced relation to the notch 34. By reason of the fact that the notch 34 is located outwardly some little distance with respect to the inner face of the groove 32 and the inner end of the notch is above the bottom of the groove, the balls 33 are, of course, held effectively in spaced relation to the notch so long as the supporting wheel member 17 is in position, the balls 33 being adapted to have an effective working relation with the hub member 30 at all times.

By the use of my improved arrangement comprising the two end thrust bearings in spaced relation to each other with a side thrust bearing interposed between the end thrust bearings, I have provided for very effective operation. By reason of my improved arrangement, in which the balls are pressed into position inwardly and laterally with respect to the grooves in which they operate, the smoothness and freedom of movement of the balls about the raceway are assured at all times by reason of the fact that the insertion notches for the balls are offset laterally with respect to the normally centered position of the balls of the raceway.

By reason of my improved arrangement in which the anti-friction balls are retained in operative position in one of the bearing members independently of any cooperative action by the other bearing member, the operation of cleaning the device is made very simple and easy so as to be performed readily by anyone without regard to mechanical skill, this result being made possible in part by the mounting of one of the sets of ball bearings in the nut by which the outside bearing member is held in position upon the inside bearing member. By this arrangement, the utmost ease of assembly and disassembly is assured.

While my invention is not to be limited in any way with respect to the use to which it is to be put, I have found that my improved arrangement is very serviceable in connection with a roller skate in connection with which stresses are applied in constantly varying directions and under constantly varying conditions during use, with the parts held in varying angular positions.

In the arrangement shown in Fig. 3, the construction is similar to that above described except with respect to the provision of an intermediate side thrust bearing. In the arrangement shown in said Fig. 3, the parts are indicated by the same reference characters as those above designated so far as such parts correspond in construction and operation. In the Fig. 3 arrangement, a hub member 35 is substituted in place of the hub member 30, being of slightly greater internal diameter than said hub portion 30. Bearing rings 36 are employed in lieu of the bearing rings 31 above described, such bearing rings 36 being slightly different from said bearing rings 31 to compensate for the changed arrangement of the hub member. An intermediate bearing comprising a series of anti-friction balls 37 is substituted for the series of balls 33, the balls 37 being held in position by means of a ring retainer 38, the ring and the balls being interposed between the inner ends of the ring members 36. The arrangement is such that the side thrust bearing comprising the balls 37 is carried by the supporting wheel member 17 rather than by the axle assembly comprising the members 11 and 18.

While I prefer to employ the form of device as shown in my drawing and as above described, it is to be understood that my invention is not limited thereto except so far as the claims may be so limited by the prior art, it being understood that changes might well be made in the form and arrangement of the parts without departing from the spirit of my invention.

I claim:—

1. In a mechanism of the type described, the combination of a hollow bearing member, a shaft member insertable forwardly through said bearing member and having its forward end portion in the form of a shank, means for limiting the forward movement of the shaft member through said bearing member, a block secured on said shank and having an undercut groove circumferentially thereabout with the wall at one side of the groove shallow and the wall at the opposite side of the groove comparatively much deeper and extending laterally over the groove, and a set of anti-friction balls mounted in said groove and normally held by the groove walls from withdrawal from the groove adapted by engagement with said first mentioned bearing member to press it against said limiting means and to give anti-friction support for said bearing member transversely of the shaft.

2. In a mechanism of the type described, the combination of a hollow bearing member, a shaft member insertable forwardly through said bearing member and having its forward end portion in the form of a screw-threaded shank, anti-friction bearing means for limiting the forward movement of the shaft through said bearing member, a nut secured by screw threads on said shank and having an undercut groove circumferentially thereabout with the wall at one side of the groove shallow and the wall at the opposite side of the groove comparatively much deeper and extending laterally over the groove, and a set of anti-friction balls mounted in said groove and normally held by the groove walls from withdrawal from the groove adapted by engagement with said first mentioned bearing member to hold it in operative relation to said first named anti-friction bearing means for giving anti-friction support for said bearing member both longitudinally and transversely of the shaft.

3. In a mechanism of the type described, the combination of a two-part shaft assembly having two grooves circumferentially thereof in the outer faces of the respective parts in spaced relation to each other with the inner wall of each of said grooves shallow and the outer wall of each of said grooves comparatively much deeper and extending laterally over the groove, a series of anti-friction balls in each of said grooves of such size as to roll freely along the groove but to be held throughout the greater portion of the length of the groove against escape therefrom, said assembly being provided with a notch in the shallow wall portion of each of said grooves through which said balls are insertable under pressure into the groove, a second bearing member mounted on said shaft assembly between said grooves having obliquely disposed bearing faces adapted by engagement with said balls to hold them normally in spaced relation to said notches, and means for detachably and adjustably connecting the parts of said shaft assembly.

4. In a mechanism of the type described, the combination of a two-part shaft assembly having two grooves circumferentially thereof in spaced relation to each other with the inner wall of each of said grooves shallow and the outer wall of each of said grooves comparatively much deeper and extending laterally over the groove, a series of anti-friction balls in each of said grooves of such size as to roll freely along the groove but to be held throughout the greater portion of the length of the groove against escape therefrom, said assembly being provided with a notch in the shallow wall portion of each of said grooves through which said balls are insertable under pressure into the groove, a second bearing member mounted on said shaft assembly between said grooves having obliquely disposed bearing faces adapted by engagement with said balls to hold them normally in spaced relation to said notches, side thrust anti-friction bearing means interposed between said shaft assembly and said second bearing member between said grooves, and means for detachably and adjustably connecting the parts of said shaft assembly.

5. In a mechanism of the type described, the combination of a two-part shaft assembly having two grooves circumferentially thereof in spaced relation to each other with the inner wall of each of said grooves shallow and the outer wall of each of said grooves comparatively much deeper and extending laterally over the groove, a series of anti-friction balls in each of said grooves of such size as to roll freely along the groove but to be held throughout the greater portion of the length of the groove against escape therefrom, said assembly being provided with a notch in the shallow wall portion of each of said grooves through which said balls are insertable under pressure into the groove, a second bearing member mounted on said shaft assembly between said grooves having obliquely disposed bearing faces adapted by engagement with said balls to hold them normally in spaced relation to said notches, a set of side thrust anti-friction bearings carried by said shaft assembly in position to support said second bearing member between said grooves, and means for detachably and adjustably connecting the parts of said shaft assembly.

ERWIN J. SCHMIDT.